(12) United States Patent
Kirst et al.

(10) Patent No.: US 8,783,645 B2
(45) Date of Patent: Jul. 22, 2014

(54) VARIABLE FLOW RATE VALVE SYSTEM

(75) Inventors: Thomas Kirst, Berlin (DE); Stefan Müller, Öhringen (DE); Kersten Grosse, Radebeul (DE); Egon Hüfner, Künzelsau (DE)

(73) Assignee: Buerkert Werke GmbH, Ingelfingen (DE)

( * ) Notice: Subject to any disclaimer, the term of this patent is extended or adjusted under 35 U.S.C. 154(b) by 288 days.

(21) Appl. No.: 13/122,978

(22) PCT Filed: Oct. 20, 2009

(86) PCT No.: PCT/EP2009/007513
§ 371 (c)(1),
(2), (4) Date: Apr. 7, 2011

(87) PCT Pub. No.: WO2010/046090
PCT Pub. Date: Apr. 29, 2010

(65) Prior Publication Data
US 2011/0192471 A1    Aug. 11, 2011

(30) Foreign Application Priority Data

Oct. 20, 2008 (DE) .......................... 20 2008 013 969

(51) Int. Cl.
*F16K 31/12* (2006.01)
*F16K 3/26* (2006.01)

(52) U.S. Cl.
CPC ........................................ *F16K 3/26* (2013.01)
USPC ........................................ 251/30.05; 251/120

(58) Field of Classification Search
USPC .................. 251/26, 122, 121, 120, 31, 30.02, 251/30.05; 137/485
See application file for complete search history.

(56) References Cited

U.S. PATENT DOCUMENTS 1,998,239 A    4/1935  Irwin
2,541,176 A *  2/1951  Rockwell .................... 137/625.3

(Continued)

FOREIGN PATENT DOCUMENTS

DE    19 83 869 US    4/1968
EP    1767841 A2    3/2007

(Continued)

OTHER PUBLICATIONS

International Search Report dated Feb. 4, 2010.
German Search Report dated Jul. 21, 2009.

*Primary Examiner* — Stephen M Hepperle
*Assistant Examiner* — Andrew J Rost
(74) *Attorney, Agent, or Firm* — Carlson, Gaskey & Olds, PC

(57) ABSTRACT

A variable flow rate valve system adjusts flow rate using the flow medium itself by creating differential pressures that determine a position of a valve member in relation to an associated valve seat. The valve system includes a diaphragm that divides a valve chamber into a control chamber and a flow chamber connected with an inlet. A valve body is connected with the diaphragm and cooperates with a valve seat to modulate flow from the inlet to an outlet and through the flow chamber. A first pilot valve in a first bypass extends between the outlet and the control chamber, and a second pilot valve in a second bypass extends between the inlet and the control chamber. The valves are controlled to selectively open or close respective bypasses to vary the flow through the flow chamber between a fully open and a fully closed condition in response to a control signal.

12 Claims, 3 Drawing Sheets

(56) References Cited

U.S. PATENT DOCUMENTS

| | | | | |
|---|---|---|---|---|
| 2,664,916 | A | * | 1/1954 | Conley .............................. 251/26 |
| 3,791,619 | A | * | 2/1974 | Pett ................................. 251/45 |
| 4,693,450 | A | * | 9/1987 | Paetzel .......................... 251/121 |
| 5,042,775 | A | * | 8/1991 | Willemsen .................. 251/30.02 |
| 5,887,847 | A | * | 3/1999 | Holborow ....................... 251/33 |
| 6,155,531 | A | * | 12/2000 | Holborow et al. ......... 251/30.02 |
| 6,244,561 | B1 | * | 6/2001 | Hansen et al. .............. 251/30.02 |
| 6,584,999 | B2 | * | 7/2003 | Inayama et al. ............. 137/487.5 |
| 6,926,249 | B2 | * | 8/2005 | Erickson et al. .............. 251/122 |
| 2004/0118462 | A1 | | 6/2004 | Baumann |

FOREIGN PATENT DOCUMENTS

| | | |
|---|---|---|
| FR | 21 25 709 A5 | 9/1972 |
| GB | 624616 A | 6/1949 |
| JP | H01-093686 A | 4/1989 |
| JP | H06-323464 A | 11/1994 |
| JP | H06-346982 A | 12/1994 |
| JP | H07-063276 A | 3/1995 |
| WO | 99/14522 A1 | 3/1999 |
| WO | 2004018914 | 3/2004 |

\* cited by examiner

VARIABLE FLOW RATE VALVE SYSTEM

RELATED APPLICATION

This application is the U.S. national phase of PCT/EP2009/007513, filed Oct. 20, 2009, which claims priority to German Application No. 20 2008 013 969.4, filed Oct. 20, 2008.

FIELD OF THE INVENTION

The present invention relates to a variable flow rate valve system, preferably for liquid media.

BACKGROUND

Variable flow rate valves have a valve member that cooperates with a valve seat to modulate a fluid flow, usually between a minimum value which may be zero and a maximum value. An actuator moves the valve member relative to the valve seat to vary the effective cross-sectional area of the flow. The actuator may be pneumatic, electro-magnetic, piezo-electric, mechanical etc. depending on a particular application and may be controlled to achieve a continuous or discontinuous characteristic of the valve responsive to a control signal. When the response is a linear function of the control signal, the valve is often referred to as a proportional valve.

SUMMARY

A variable flow rate valve system adjusts the flow rate using the flow medium itself by creating differential pressures that determine the position of a valve member in relation to an associated valve seat. Specifically, the valve system includes a valve chamber with an inlet and an outlet. A diaphragm divides the valve chamber into a control chamber and a flow chamber connected with the inlet. A valve seat is arranged in the flow chamber on the side of the outlet. A valve body is connected with the diaphragm and cooperates with the valve seat to modulate a flow from the inlet to the outlet and through the flow chamber. A first pilot valve is located in a first bypass that extends between the outlet and the control chamber, and a second pilot valve is located in a second bypass that extends between the inlet and the control chamber. The first and second pilot valves are controlled to selectively open or close the first and second bypasses thereby continuously varying the flow through the flow chamber between a fully open and a fully closed condition, or varying the flow in discrete steps, in response to a control signal. The valve member is actuated solely by the medium itself, e.g. water, by creating appropriate differential pressures on both sides of the diaphragm. The first and second pilot valves are preferably pulse controlled by a control unit that receives a control signal on an input. The valve system may have a proportional characteristic. Preferably, the first pilot valve is a normally closed valve and the second pilot valve is a normally open valve. This ensures that the valve is safely closed in case of a current supply failure.

An advantageous application of the inventive valve system is an armature for a shower-bath where two such valve systems would be used feeding into a common mixing chamber under control of a temperature regulator.

In a further aspect of the invention a valve member is provided which is advantageously, but not necessarily, used in the variable flow rate valve system. The valve member has a generally cylindrical valve body with two opposed end faces and a peripheral wall extending between the end faces. At least one recess is formed in the peripheral wall extending inwardly, and a bore extends from one of the end faces and opens into the recess. The recess is generally wedge-shaped and extends transversely to the axis of the valve body. The recess can be defined by surfaces composed of surface sections having different angles of inclination in relation to the axis of the valve body.

With a conventional cone-shaped valve member and in the case of a small actuating travel for realizing low rates of flow of media, high flow velocities may appear when the medium flows past on the entire periphery of the cone. This produces a suction which acts in a direction opposite to the actuation direction, which makes a sensitive closed-loop control more difficult or even impossible. The proposed valve member can reliably and precisely control desired flow rates even in the case of a small actuating travel.

A further advantage resides in the reduction of the tendency to oscillate, which is an undesirable phenomenon frequently observed in similar systems.

In an advantageous configuration of the valve system, the end face on the drive side of the valve member is connected to the diaphragm which seals the valve seat in the closed valve position. The diameter of the bore in the valve body advantageously corresponds to the nominal width of the valve.

This geometry of the valve member allows the full medium flow to be able to flow off downwards and laterally even in the case of small flow rates.

In addition, with the surface area of the valve member acted upon by the flow having the same slope and with a small actuating travel, a considerably smaller flow area is exposed to the medium than in conventional valves with a cone-shaped valve member.

The control characteristic is adjustable by the number and the geometric configuration of the wedge-shaped incisions, the angles defining the surfaces of the at least one wedge in relation to each other, and to the end faces of the valve member taking a determinative role for the characteristic.

These and other features of the present invention can be best understood from the following specification and drawings, of which the following is a brief description.

DETAILED DESCRIPTION

Figure 1:
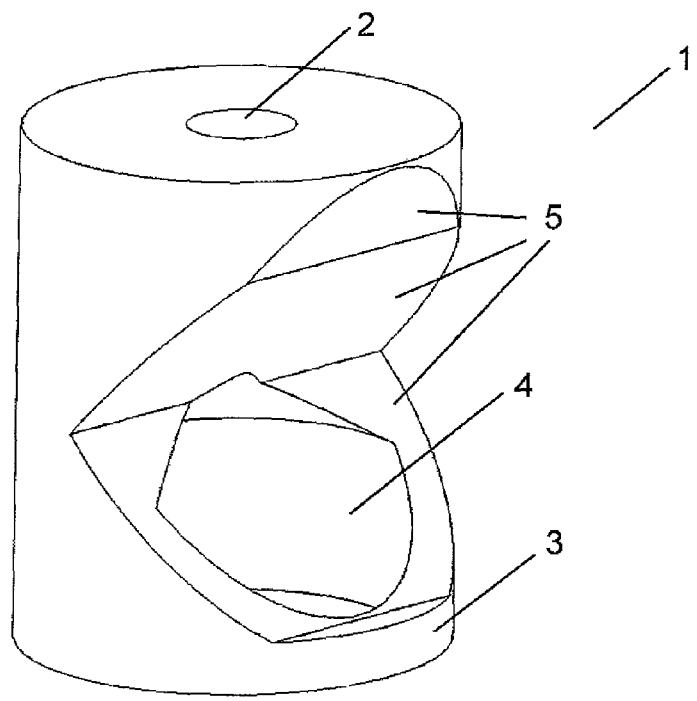
FIG. 1 shows a three-dimensional illustration of a valve member for the valve according to the invention.

FIG. 1 shows a valve member 1, which in a disclosed valve system configuration, may replace a conventional cone-shaped valve body that is otherwise normally used.

The valve member 1 has a generally cylindrical valve body with an attachment hole 2 in one of the oppositely located, parallel end faces and a bore 4 through the other end face with a sufficiently large diameter w (FIG. 3, 4) to correspond to the nominal width of the valve system.

At one end face, the cylindrical geometry of the valve member is maintained over the full periphery, at least in a partial area 3, for guidance purposes. In this way, any tilting or jamming of the valve member 1 during the sequence of movement in operation is ruled out.

The valve member 1 includes at least one wedge-shaped recess which extends transversely to the central axis of the valve member 1 and is defined by side surfaces 5.

The side surface 5 adjacent to the end face in which the bore 4 is located is at least partly also part of the bore 4, as a result of which an open connection is produced between this end face and the side surface adjacent to it.

When the valve is in the open condition, there is a flow of medium through this connection, the connection determining a path between an inlet and an outlet.

The valve member 1 may be manufactured either from a metallic material or from a suitable plastic material.

Figure 2:
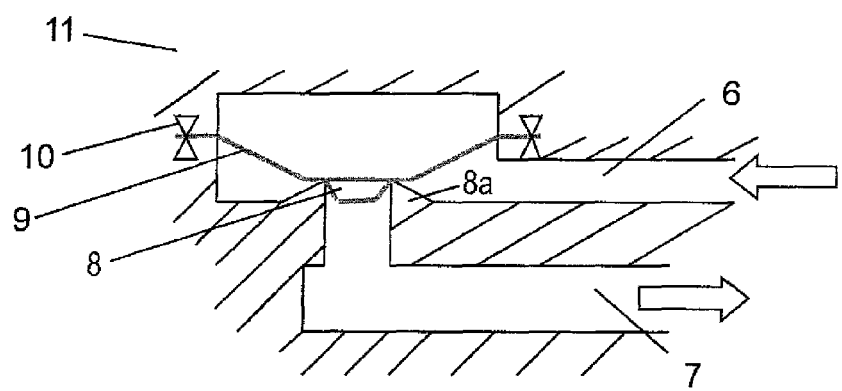
FIG. 2 shows a schematic sectional view of a section taken through part of a diaphragm valve having a conventional control cone.

FIG. 2 illustrates a typical diaphragm valve having a conventional cone-shaped valve body 8.

Inlet 6 and outlet 7 are arranged in a valve housing 11 of the valve. In the closed condition of the valve, the inlet 6 and the outlet 7 are separated by virtue of the valve body 8 sitting on a valve seat 8a in a sealing manner. A diaphragm 9 to which the valve body 8 is attached, is held in the valve housing 11 by a clamping structure 10.

Preferably, the cone-shaped valve body 8 is replaced by the valve member 1 described above, as illustrated in FIG. 3. In this case, the valve member 1 has only one wedge-shaped recess, and is connected to an actuating rod 9a.

Figure 3:
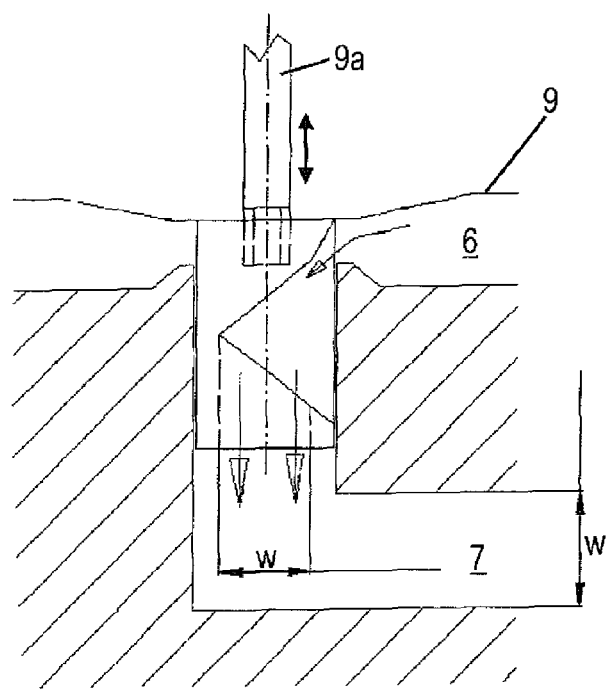
FIG. 3 shows a schematic sectional view of a first embodiment of the valve member with a valve seat.
Figure 4:
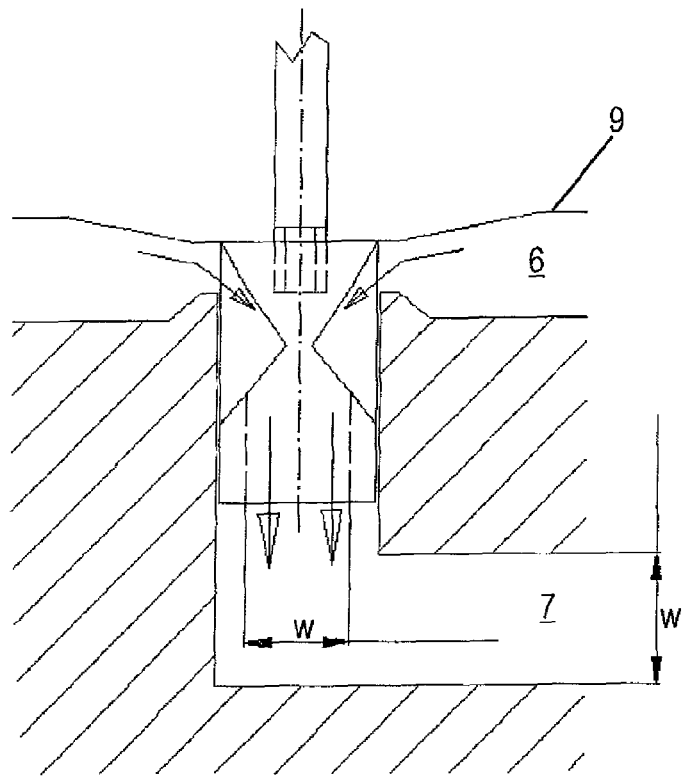
FIG. 4 shows a schematic sectional view of a second embodiment of the valve member with a valve seat.

In the embodiment shown in FIG. 4, the valve body has two identical wedge-shaped recesses located radially opposite each other. Otherwise the embodiments of FIGS. 3 and 4 are similar.

Figure 5:
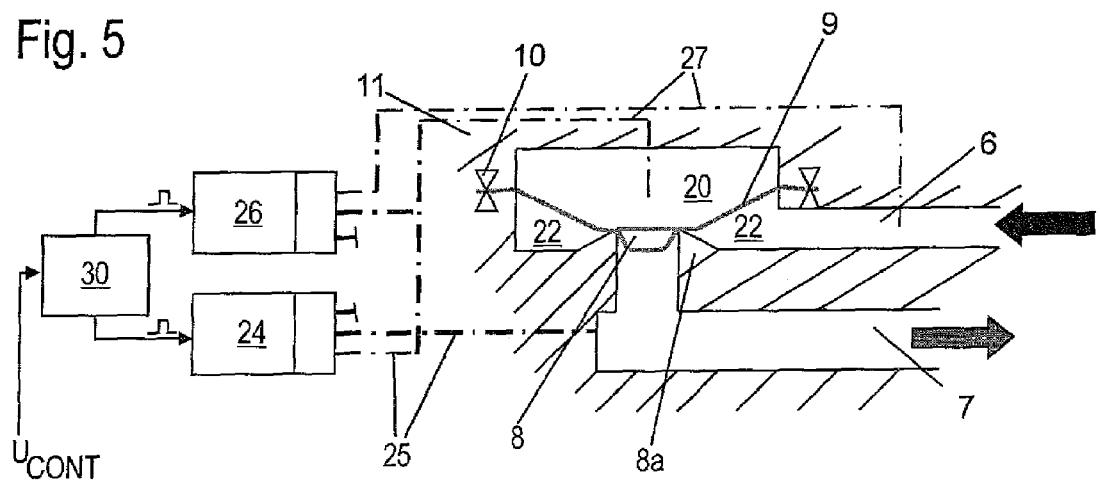
FIG. 5 shows a schematic view of a variable flow rate valve system.

In FIG. 5, a variable flow rate valve system is shown. The system has a diaphragm valve similar to that shown in FIG. 2, with a cone-shaped valve body 8 which, however, may be replaced by valve member 1 described above. The valve housing 11 contains a valve chamber which is divided by diaphragm 9 into a control chamber 20 and a fluid flow chamber 22 connected with inlet 6. Pilot valves 24 and 26 are associated with the diaphragm valve. The first pilot valve 24 is inserted in a first bypass 25 that extends between control chamber 20 and outlet 7. The second pilot valve 26 is inserted in a second bypass 27 that extends between control chamber 20 and inlet 6.

The pilot valves 24 and 26 are pulsed by electric control signals received from a common control unit 30, an input of which receives a control signal $U_{cont}$. The first pilot valve 24 is a normally closed valve, and the second pilot valve 26 is a normally open valve. Accordingly, as long as no control pulses are applied to the pilot valves, bypass 27 is open and control chamber 20 is exposed to pressure from the inlet 6, which pressure acts on diaphragm 9 to urge valve body 8 against valve seat 8a, thereby completely blocking any flow from inlet 6 to outlet 7. In case of a current supply failure, the valve system ensures blocking between inlet 6 and outlet 7. This is an important safety feature.

In operation, the control unit 30 applies control pulses to both pilot valves 24, 26 to obtain a desired flow rate in response to control signal $U_{cont}$. In particular, the flow rate may be proportional to the value of the control signal $U_{cont}$. In fact, the position of the valve body 8 relative to the valve seat 8a depends on the differential pressure acting on diaphragm 9 which, in turn, depends on the opening/closing conditions of bypasses 25 and 27. Otherwise expressed, it is the volume of fluid in control chamber 20 that determines the position of valve body 8 relative to valve seat 8a. When bypass 27 is open, input pressure is applied to control chamber 20, tending to move valve body 8 closer to valve seat 8a. When bypass 25 is open, pressure in control chamber 20 is allowed to be released by draining fluid to outlet 7, thereby tending to move valve body 8 away from valve seat 8a. Accordingly, any response of the resulting rate of fluid flow to the applied control signal $U_{cont}$, be it proportional, continuous, or in discrete steps, can be easily tailored by programming control unit 30 to issue pulse patterns to both pilot valves 24, 26 to achieve a target value of flow.

Figure 6:
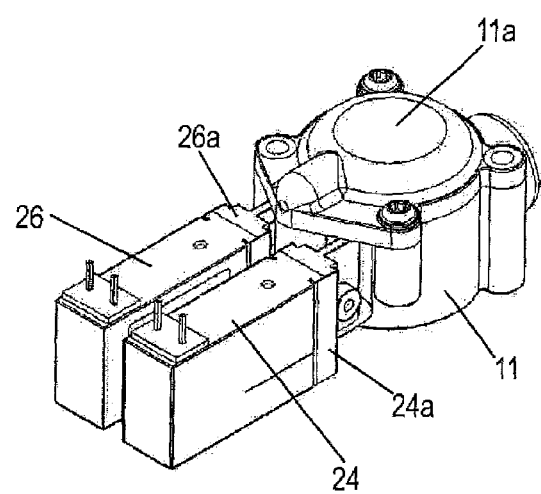
FIG. 6 shows a perspective view of a diaphragm valve with two pilot valves.

In FIG. 6, one out of many possible physical implementations of the valve system is illustrated. Valve housing 11 is generally cylindrical, with a cover 11a. Pilot valves 24 and 26 are connected to housing 11 at integrally formed housing flanges 24a and 26a, respectively. This is an important aspect of the invention since conventional and commercially available miniature valves can be used as pilot valves.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A valve system comprising:
a valve chamber with an inlet and an outlet;
a diaphragm dividing the valve chamber into a control chamber and a flow chamber connected with the inlet;
a valve seat arranged in the flow chamber on a side of the outlet;
a generally cylindrical valve body connected with the diaphragm and cooperating with the valve seat to modulate a flow from the inlet to the outlet and through the flow chamber,
the valve body having two opposed end faces and a peripheral wall extending between the two opposed end faces, at least one inwardly extending recess being formed in the peripheral wall, and a bore extending from one of said end faces and opening into the at least one inwardly extending recess,
wherein the at least one inwardly extending recess is generally wedge-shaped and extends transversely to an axis of the cylindrical valve body,
wherein the at least one inwardly extending recess is defined by surfaces composed of surface sections having different angles of inclination in relation to the axis of the cylindrical valve body, and
wherein at the end face comprising the bore, cylindrical geometry of the valve member is maintained over a full periphery, at least in a partial area;
a first pilot valve located in a first bypass that extends between the outlet and the control chamber;
a second pilot valve located in a second bypass that extends between the inlet and the control chamber; and
a control unit for controlling the first and second pilot valves to selectively open or close the first and second bypasses thereby varying the flow through the flow chamber between a fully open and a fully closed condition.

2. The valve system according to claim 1, wherein the first and second pilot valves are pulse controlled by the control unit.

3. The valve system according to claim 1, wherein the first pilot valve is a normally closed valve and the second pilot valve is a normally open valve.

4. The valve system according to claim 1, wherein the control unit controls the first and second pilot valves to adjust an amount of flow in response to an input signal.

5. The valve member system to claim 1, wherein the bore has a width that corresponds to a nominal width of a valve in which the valve member is used.

6. The valve system according to claim 1, wherein the at least one inwardly extending recess is selectively in fluid communication with the inlet.

7. The valve system according to claim 1, wherein at the end face which includes the bore, the peripheral wall completely surrounds the bore.

8. The valve system according to claim 7, wherein at the inwardly extending recess, the peripheral wall partially surrounds the bore such that the recess is open into the bore.

9. A valve member for a variable flow rate valve comprising:
- a generally cylindrical valve body with two opposed end faces and a peripheral wall extending between the two opposed end faces, at least one inwardly extending recess being formed in the peripheral wall, and a bore extending from one of said end faces and opening into the at least one inwardly extending recess;
- wherein the at least one inwardly extending recess is generally wedge-shaped and extends transversely to an axis of the cylindrical valve body;
- wherein the at least one inwardly extending recess is defined by surfaces composed of surface sections having different angles of inclination in relation to the axis of the cylindrical valve body; and
- wherein at the end face comprising the bore, cylindrical geometry of the valve member is maintained over a full periphery, at least in a partial area.

10. The valve member according to claim 9, wherein the bore has a width that corresponds to a nominal width of a valve in which the valve member is used.

11. The valve member according to claim 9, wherein at the end face which includes the bore, the peripheral wall completely surrounds the bore.

12. The valve member according to claim 11, wherein at the inwardly extending recess, the peripheral wall partially surrounds the bore such that the recess is open into the bore.

* * * * *

UNITED STATES PATENT AND TRADEMARK OFFICE
CERTIFICATE OF CORRECTION

| | | |
|---|---|---|
| PATENT NO. | : 8,783,645 B2 | Page 1 of 1 |
| APPLICATION NO. | : 13/122978 | |
| DATED | : July 22, 2014 | |
| INVENTOR(S) | : Thomas Kirst | |

It is certified that error appears in the above-identified patent and that said Letters Patent is hereby corrected as shown below:

IN THE CLAIMS:

In claim 1, column 4, line 52; delete "at least in a partial area,"

In claim 5, column 5, line 4; after "system" insert --according--

In claim 9, column 6, line 12; delete "at least in a partial area,"

Signed and Sealed this
Seventh Day of October, 2014

Michelle K. Lee
*Deputy Director of the United States Patent and Trademark Office*